US008825018B2

(12) United States Patent
Slack

(10) Patent No.: US 8,825,018 B2
(45) Date of Patent: Sep. 2, 2014

(54) METHODS AND APPARATUS FOR INCREASING VOICE CALL PERFORMANCE THROUGH CONTROLLED INTERRUPTION OF DATA TRANSFER IN A RELAY NETWORK

(75) Inventor: Phillip Edward Slack, Slough (GB)

(73) Assignee: BlackBerry Limited, Waterloo (CA)

( * ) Notice: Subject to any disclaimer, the term of this patent is extended or adjusted under 35 U.S.C. 154(b) by 180 days.

(21) Appl. No.: 12/791,549

(22) Filed: Jun. 1, 2010

(65) Prior Publication Data

US 2011/0294485 A1 Dec. 1, 2011

(51) Int. Cl.
*H04M 3/42* (2006.01)
*H04W 40/00* (2009.01)

(52) U.S. Cl.
USPC ........................................ 455/414.1; 455/445

(58) Field of Classification Search
USPC .................. 455/414.1, 445, 3.06, 426.1; 379/70–84, 259–271, 157–158; 370/395.72
See application file for complete search history.

(56) References Cited

U.S. PATENT DOCUMENTS

| 4,995,074 | A | * | 2/1991 | Goldman et al. | 379/93.35 |
|---|---|---|---|---|---|
| 5,745,695 | A | * | 4/1998 | Gilchrist et al. | 709/227 |
| 5,881,060 | A | | 3/1999 | Morrow et al. | |
| 5,931,904 | A | * | 8/1999 | Banga et al. | 709/217 |
| 6,658,266 | B1 | * | 12/2003 | Inokura et al. | 455/553.1 |
| 6,711,141 | B1 | | 3/2004 | Rinne et al. | |
| 7,054,323 | B2 | | 5/2006 | Viola et al. | |
| 7,272,215 | B2 | | 9/2007 | Bremer et al. | |
| 7,433,961 | B2 | | 10/2008 | Munje et al. | |
| 2002/0087716 | A1 | | 7/2002 | Mustafa | |
| 2002/0091834 | A1 | * | 7/2002 | Isozu et al. | 709/227 |
| 2004/0095903 | A1 | | 5/2004 | Ryan et al. | |
| 2004/0168052 | A1 | * | 8/2004 | Clisham et al. | 713/153 |

(Continued)

FOREIGN PATENT DOCUMENTS

| WO | 9912380 A1 | 7/1999 |
|---|---|---|
| WO | 02076025 A1 | 9/2002 |
| WO | 2004059997 A1 | 7/2004 |
| WO | 2009024910 A2 | 2/2009 |

OTHER PUBLICATIONS

European Search Report & Written Opinion for EP patent application # 10164661.0, Jul. 12, 2010.

(Continued)

*Primary Examiner* — Daniel Lai
(74) *Attorney, Agent, or Firm* — Perry + Currier Inc.

(57) ABSTRACT

Methods and apparatus for use by a mobile communication device (MCD) operating in a wireless communication network for increasing call performance through controlled temporary interruption of data transfer by the relay network outside of the wireless network. One illustrative method involves identifying a voice call request at the MCD operating in the wireless network and, in response to identifying the voice call request, performing the following actions of sending a pause data indicator to the relay network over the wireless communication network; sending a call confirm or setup voice call message to the wireless communication network for establishing the voice call; and maintaining the voice call at the mobile communication device. The pause data indicator is defined to pause data transfer for the MCD at the relay network. The method may further involve identifying a voice call termination request during the voice call and, in response to identifying the voice termination request, performing the following actions of sending a disconnect voice call message to the wireless communication network; and sending a resume data indicator to the relay network over the wireless communication network.

15 Claims, 11 Drawing Sheets

(56) References Cited

U.S. PATENT DOCUMENTS

| | | |
|---|---|---|
| 2004/0224694 A1 | 11/2004 | Zhao et al. |
| 2005/0041640 A1* | 2/2005 | Nasielski et al. ............. 370/352 |
| 2005/0064891 A1 | 3/2005 | Chaudry et al. |
| 2005/0085250 A1 | 4/2005 | Lee et al. |
| 2005/0213530 A1* | 9/2005 | Kuure et al. ................. 370/328 |
| 2005/0226202 A1* | 10/2005 | Zhang et al. ................. 370/349 |
| 2006/0126544 A1* | 6/2006 | Markel et al. ................ 370/310 |
| 2008/0310305 A1 | 12/2008 | Lee |
| 2009/0262672 A1* | 10/2009 | Sin et al. ...................... 370/297 |
| 2009/0279489 A1 | 11/2009 | Deu-Ngoc et al. |
| 2010/0211689 A1* | 8/2010 | Bijwaard et al. .............. 709/228 |

OTHER PUBLICATIONS

"3rd Generation Partnership Project; Technical Specification Group GSM/EDGE Radio Access Network; Mobile Radio Interface Layer 3 Specification; Radio Resource Control (RRC) Protocol", 3GPP TS44.018, vol. 6.3.0, Jul. 2003.

H. Schulzrinne et al. Real Time Streaming Protocol (RTSP); Apr. 1998, pp. 1-91.

* cited by examiner

FIG. 1
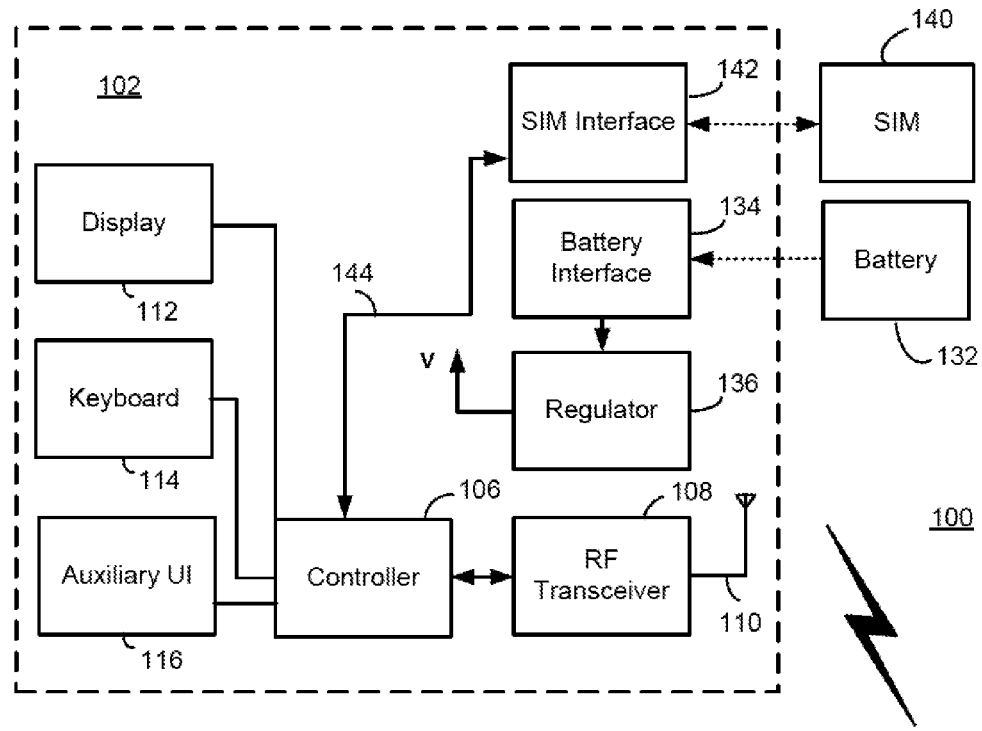
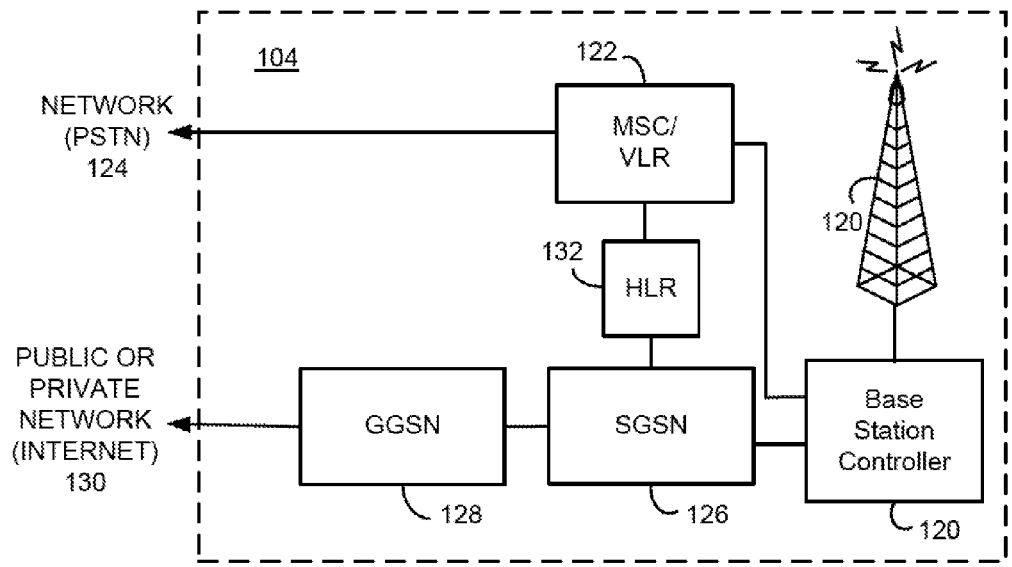

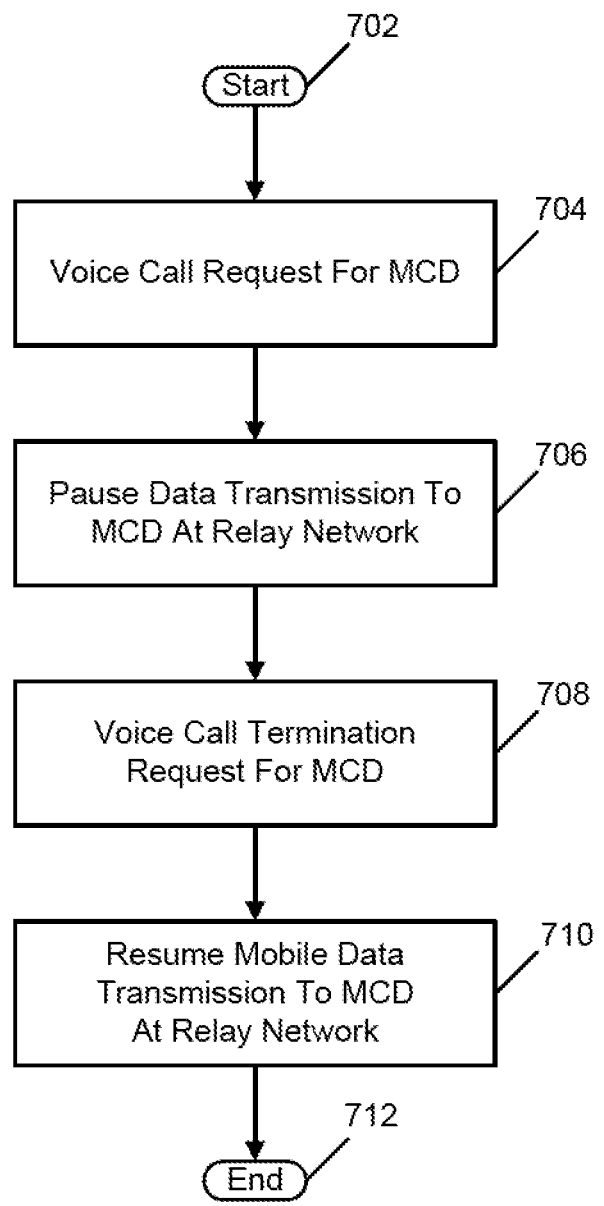

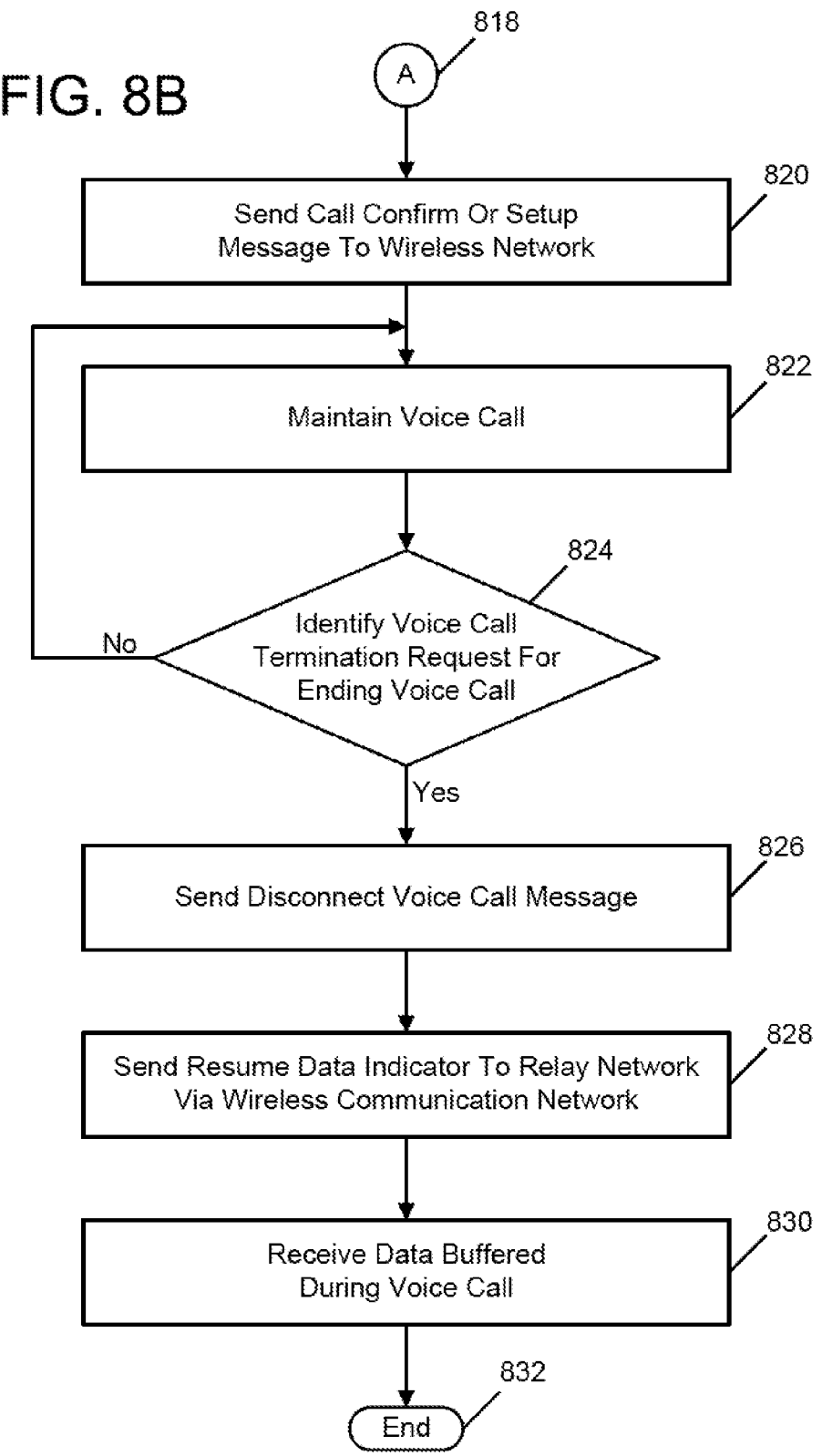

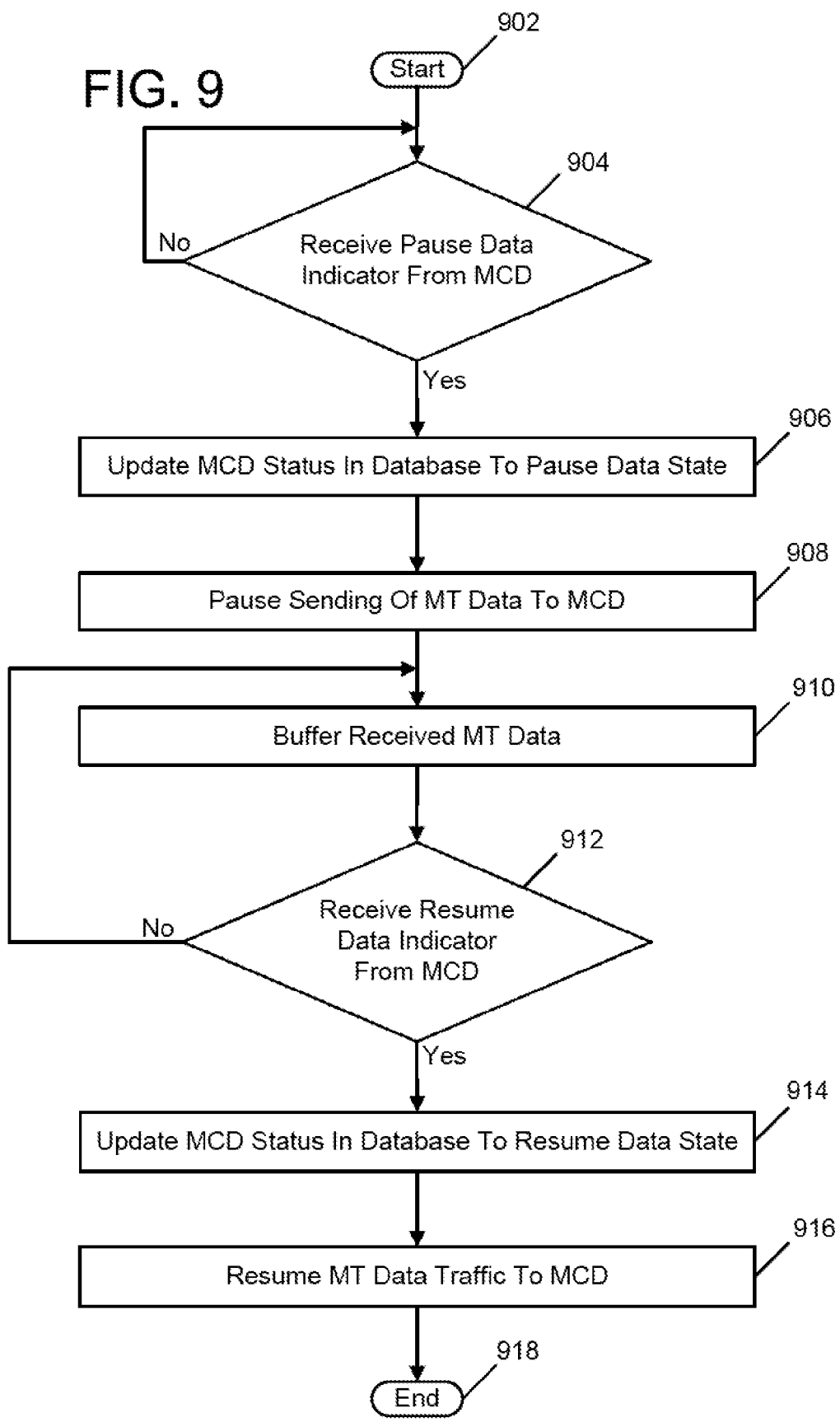

METHODS AND APPARATUS FOR INCREASING VOICE CALL PERFORMANCE THROUGH CONTROLLED INTERRUPTION OF DATA TRANSFER IN A RELAY NETWORK

BACKGROUND

1. Field of the Technology

The present disclosure relates generally to communications which involve mobile communication devices operating in wireless communication networks, and more particularly to communication techniques involving the temporary interruption of mobile data transfer while a mobile communication device is participating in a voice call.

2. Description of the Related Art

Mobile communication devices (MCDs) have the ability to place and receive voice calls, as well as to send and receive various user data to and from other communication devices (e.g. telephones, servers, personal computers (PCs), etc.), through wireless communication networks. For example, MCDs may be configured to wirelessly receive copies of e-mail messages which are received and stored in email accounts on e-mail servers in communication networks. To accomplish this, many different host servers are utilized across the country and beyond to retrieve copies of e-mail messages from the many different e-mail servers for their intermediate delivery to a primary relay network. The primary relay network is communicatively coupled to a plurality of wireless communication networks and used to deliver the copied e-mail messages to MCDs through any one of these wireless networks.

In Third Generation (3G) networks or the like, MCDs are capable of communicating such data while maintaining voice calls. Depending on the network or configuration, however, voice calls may be dropped while communicating such background data. In some networks, the reason is that such simultaneous voice and data communication requires the network to adopt, depending on configuration and load, varying dynamic radio bearer configurations and procedures which results in an increased signaling load in the Radio Network Controller (RNC). A common limitation of infrastructure vendors' RNC implementation is that operations are processed serially. Such serial processing can result in the introduction of delays in the processing of operations which are vital for the maintenance and good performance of communication. The communication of such background data is normally transparent to users; therefore, the reason for the voice call failure is not even apparent to the user.

Accordingly, there is a resulting need for improved methods and apparatus for increasing voice call performance for MCDs operating in such networks.

BRIEF DESCRIPTION OF THE DRAWINGS

Embodiments of present disclosure will now be described by way of example with reference to attached figures, wherein:

FIG. 1 is a block diagram which illustrates pertinent components of a mobile communication device (MCD) and a wireless communication network;

FIG. 7 is a flowchart of a method for use in increasing voice call performance through temporary interruption of data transfer in the relay network;

FIG. 8A-8B is a more detailed flowchart of FIG. 7, showing the method from the perspective of the MCD; and FIG. 9 is a more detailed flowchart of FIG. 7, showing the method from the perspective of the relay network.

DETAILED DESCRIPTION OF THE PREFERRED EMBODIMENTS

Figure 2:
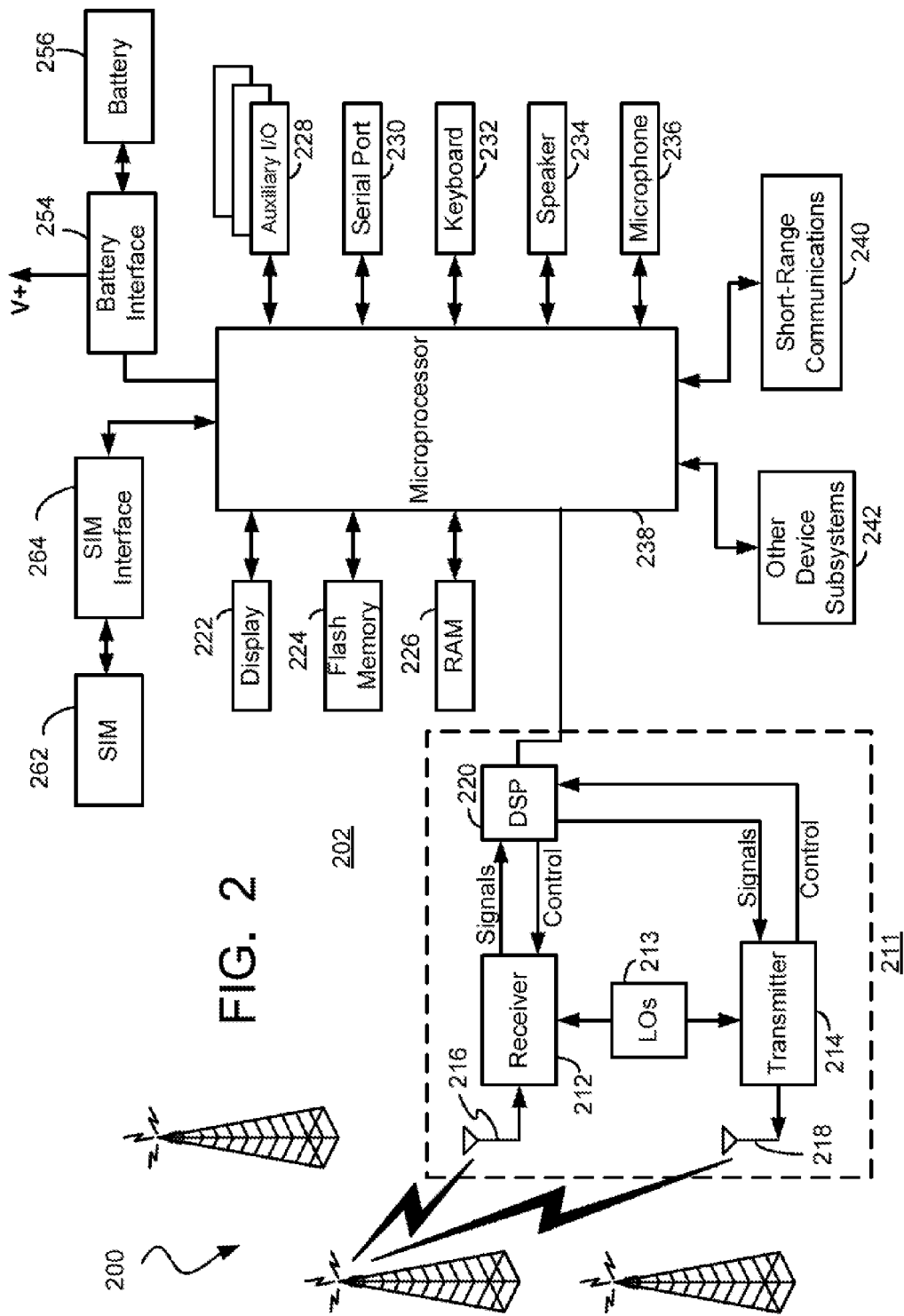
FIG. 2 is a more detailed diagram of a preferred MCD of FIG. 1.

Methods and apparatus for use by a mobile communication device (MCD) operating in a wireless communication network for increasing call performance through controlled temporary interruption of data transfer in a relay network outside of the wireless network are disclosed. One illustrative method involves the steps of identifying a voice call request at the MCD operating in a wireless network and, in response to identifying the voice call request, performing the following actions of sending a pause data indicator to the relay network via the wireless network; sending a call confirm or call setup message to the wireless network; and maintaining the voice call at the MCD. The pause data indicator is defined to pause data transfer at the relay network. Preferably, data transfer occurs in a data session (e.g. as defined by a Packet Data Protocol "PDP" context), and the sending of the pause data indicator causes the data transfer to be paused while maintaining the data session (i.e. the data session is not terminated). On the other hand, the MCD may receive service-essential data (e.g. remote data wipes, IT updates, etc.) during the voice call. The method may further involve identifying the voice call termination request for ending the voice call at the MCD and, in response to identifying the voice call termination request, performing the following actions of sending a disconnect voice call message to the wireless network; sending a resume data indicator to the relay network via the wireless network; and receiving, at the MCD, the data that was buffered by the relay network during the voice call. The resume data indicator is defined to resume data transfer at the relay network.

Another illustrative method for use by the relay network connected outside of the wireless network involves the steps of receiving a pause data indicator from the MCD and, in response to receiving the pause data indicator, performing the following actions of updating the MCD status in a relay network database to a pause data state; pausing sending of all received mobile-terminated data to the MCD; and buffering the received mobile-terminated data. The method may involve the further step of receiving a resume data indicator from the MCD and, in response to receiving the resume data indicator, performing the following actions of updating the MCD status in the relay network database to a resume data state; and resuming the mobile-terminated data traffic to the MCD.

Advantageously, the present techniques reduce the likelihood of dropping voice calls for MCDs. Communication of mobile-terminated data (such as email data) is suspended during a voice call, but then subsequently resumed to the MCD after completion of the voice call. Such techniques are performed in the relay network which is outside of the wireless network, without requiring awareness or special processing or modifications in the wireless network, and without significantly increasing the signaling load in the wireless network. Also specifically, the present techniques do not require data sessions (e.g. PDP contexts) of the MCD to be torn down and re-established, and the dynamically-assigned IP address to be changed, every time the MCD operates in a voice call. The relay network has the responsibility of buffering mobile-terminated data once the voice call is established and the pause data indicator is received, as well as resuming the mobile-terminated data transmission once the voice call is terminated and the resume data indicator is received. Note further that the present techniques may be implemented with use of existing signaling protocols established between the relay network and the MCD. The present techniques may also maintain a level of security in the wireless network by allowing essential or emergency mobile-terminated traffic, such as remote wipe commands or IT policy updates to be delivered to the MCD, even if other mobile-terminated data to the MCD is paused.

One illustrative environment of the present disclosure will now be described in relation to the drawings. FIG. 1 shows a block diagram of a communication system 100 which includes a mobile communication device (MCD) 102 which communicates through a wireless communication network 104. In the preferred embodiment, MCD 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of MCD 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in MCD 102, information for transmission to network 104, a telephone number to place a telephone call, commands to be executed on MCD 102, and possibly other or different user inputs.

MCD 102 sends communication signals to and receives communication signals from network 104 over a wireless link via antenna 110. RF transceiver circuitry 108 performs functions similar to those of a tower station 118 and a base station controller (BSC) 120 (described later below), including for example modulation/demodulation and possibly encoding/decoding and encryption/decryption. It is also contemplated that RF transceiver circuitry 108 may perform certain functions in addition to those performed by BSC 120. It will be apparent to those skilled in art that RF transceiver circuitry 108 will be configured to particular wireless network or networks in which MCD 102 is intended to operate. When MCD 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

MCD 102 includes a battery interface 134 for receiving one or more rechargeable batteries 138. Battery 138 electrical power to electrical circuitry in MCD 102, and battery interface 134 provides for a mechanical and electrical connection for battery 132. Battery interface 134 is coupled to a regulator 136 which regulates power to the device. MCD 102 may be a handheld portable communication device, which includes a housing (e.g. a plastic housing) which carries and contains the electrical components of MCD 102 including battery 138. MCD 102 operates using a Subscriber Identity Module (SIM) 140 which is connected to or inserted in MCD 102 at a SIM interface 142. SIM 140 is one type of a conventional "smart card" used to identify an end user (or subscriber) of MCD 102 and to personalize the device, among other things. Without SIM 140, the MCD terminal is not fully operational for communication through wireless network 104. By inserting SIM 140 into MCD 102, an end user can have access to any and all of his/her subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical MCD. SIM 140 may store additional user information for the MCD as well, including datebook (or calendar) information and recent call information.

MCD 102 may consist of a single unit, such as a data communication device, a cellular telephone, a multiple-function communication device with data and voice communication capabilities, a personal digital assistant (PDA) enabled for wireless communication, or a computer incorporating an internal modem. Preferably, as mentioned earlier, MCD 102 is a handheld portable communication device which includes a housing (e.g. a plastic housing) which carries and contains the electrical components of MCD 102. Alternatively, MCD 102 may be a multiple-module unit comprising a plurality of separate components, including but in no way limited to a computer or other device connected to a wireless modem. In particular, for example, in the MCD block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be configured to connect to and effectively assume control of RF transceiver circuitry 108 and antenna 110 of a single-unit device such as one of those described above. Such a MCD 102 may have a more particular implementation as described later in relation to MCD 202 of FIG. 2.

MCD 102 communicates in and through wireless communication network 104. Wireless communication network 104 may be a cellular telecommunications network. In the embodiment of FIG. 1, wireless network 104 is configured in accordance with General Packet Radio Service (GPRS) and a Global Systems for Mobile (GSM) technologies. Today, such a MCD may further operate in accordance with Enhanced Data rates for GSM Evolution (EDGE) or Enhanced GPRS (EGPRS), as described in the Background section. In such environment, wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

Station 118 is a fixed transceiver station, and station 118 and BSC 120 may be referred to as transceiver equipment. The transceiver equipment provides wireless network coverage for a particular coverage area commonly referred to as a "cell". The transceiver equipment transmits communication signals to and receives communication signals from MCDs within its cell via station 118. The transceiver equipment normally performs such functions as modulation and possibly encoding and/or encryption of signals to be transmitted to the MCD in accordance with particular, usually predetermined, communication protocols and parameters, under control of its controller. The transceiver equipment similarly demodulates and possibly decodes and decrypts, if necessary, any communication signals received from MCD 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and MCD 102. An RF channel is a limited resource that must be conserved, typically due to limits in overall bandwidth and a limited battery power of MCD 102. Those skilled in art will appreciate that a wireless network in actual practice may include hundreds of cells, each served by a station 118 (i.e. or station sector), depending upon desired overall expanse of network coverage. All pertinent components may be connected by multiple switches and routers (not shown), controlled by multiple network controllers.

For all MCD's 102 registered with a network operator, permanent data (such as MCD 102 user's profile) as well as temporary data (such as MCD's 102 current location) are stored in HLR 132. In case of a voice call to MCD 102, HLR 132 is queried to determine the current location of MCD 102. A Visitor Location Register (VLR) of MSC 122 is responsible for a group of location areas and stores the data of those MCDs that are currently in its area of responsibility. This includes parts of the permanent MCD data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Being part of the GPRS network, serving GPRS Support Node (SGSN) 126 is at the same hierarchical level as MSC 122 and keeps track of the individual locations of MCDs. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on algorithms, keys, and criteria (e.g. as in existing GSM). In conventional operation, cell selection may be performed autonomously by MCD 102 or by the transceiver equipment instructing MCD 102 to select a particular cell. MCD 102 informs wireless network 104 when it reselects another cell or group of cells, known as a routing area.

In order to access GPRS services, MCD 102 first makes its presence known to wireless network 104 by performing what is known as a GPRS "attach". This operation establishes a logical link between MCD 102 and SGSN 126 and makes MCD 102 available to receive, for example, pages via SGSN, notifications of incoming GPRS data, or SMS messages over GPRS. In order to send and receive GPRS data, MCD 102 assists in activating the packet data address that it wants to use. This operation makes MCD 102 known to GGSN 128; interworking with external data networks can thereafter commence. User data may be transferred transparently between MCD 102 and the external data networks using, for example, encapsulation and tunneling. Data packets are equipped with GPRS-specific protocol information and transferred between MCD 102 and GGSN 128.

FIG. 2 is a more detailed block diagram of one type of mobile communication device (MCD) 202 of the present disclosure. In this embodiment, MCD 202 is a two-way communication device having at least voice and advanced data communication capabilities, including the capability to communicate with other computer systems. Depending on the functionality provided by MCD 202, it may be referred to as a data messaging device, a two-way pager, a cellular telephone with data messaging capabilities, a wireless Internet appliance, or a data communication device (with or without telephony capabilities). MCD 202 may communicate with any one of a plurality of fixed transceiver stations 200 within its geographic coverage area.

MCD 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which MCD 202 is intended to operate.

MCD 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of MCD 202, and therefore MCD 202 requires a Subscriber Identity Module or "SIM" card 262 to be inserted in a SIM interface 264 in order to operate in the network. SIM 262 includes those features described in relation to FIG. 1. MCD 202 is a battery-powered device so it also includes a battery interface 254 for receiving one or more rechargeable batteries 256. Such a battery 256 provides electrical power to most if not all electrical circuitry in MCD 202, and battery interface 254 provides for a mechanical and electrical connection for it. The battery interface 254 is coupled to a regulator (not shown) which provides a regulated voltage V to all of the circuitry.

MCD 202 includes a microprocessor 238 (which is one implementation of controller 106 of FIG. 1) which controls overall operation of MCD 202. Communication functions, including at least data and voice communications, are performed through communication subsystem 211. The communication techniques of the present disclosure for MCD 202 may generally be implemented in microprocessor 238 with use of computer instructions. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on MCD 202. A predetermined set of applications which control basic device operations, including at least data and voice communication applications, will normally be installed on MCD 202 during its manufacture. A preferred application that may be loaded onto MCD 202 may be a personal information manager (PIM) application having the ability to organize and manage data items relating to user such as, but not limited to, e-mail, calendar events, voice mails, appointments, and task items. Naturally, one or more memory stores are available on MCD 202 and SIM 256 to facilitate storage of PIM data items and other information. The PIM application preferably has the ability to send and receive data items via the wireless network. In the present disclosure, PIM data items are seamlessly integrated, synchronized, and updated via the wireless network, with the MCD user's corresponding data items stored and/or associated with a host computer system thereby creating a mirrored host computer on MCD 202 with respect to such items. This is especially advantageous where the host computer system is the MCD user's office computer system. Additional applications may also be loaded onto MCD 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of MCD 202 and may provide enhanced on-device functions, communication-related functions, or both.

The PIM application preferably has the ability to send and receive data items via the wireless network. In a preferred embodiment, PIM data items are seamlessly integrated, synchronized, and updated via the wireless network, with the MCD user's corresponding data items stored and/or associated with a host computer system thereby creating a mirrored host computer on MCD 202 with respect to such items. This is especially advantageous where the host computer system is the MCD user's office computer system. Additional applications may also be loaded onto MCD 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of MCD 202 and may provide enhanced on-device functions, communication-related functions, or both. For example, secure communication applications may enable electronic commerce functions and other such financial transactions to be performed using MCD 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of MCD 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211. For voice communications, the overall operation of MCD 202 is substantially similar, except that the received signals would be output to speaker 234 and signals for transmission would be generated by microphone 236. Alternative voice or audio I/O subsystems, such as a voice message recording subsystem, may also be implemented on MCD 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of MCD 202 by providing for information or software downloads to MCD 202 other than through a wireless communication network. The alternate download path may, for example, be used to load an encryption key onto MCD 202 through a direct and thus reliable and trusted connection to thereby provide secure device communication. Short-range communications subsystem 240 of FIG. 2 is an additional optional component which provides for communication between MCD 202 and different systems or devices, which need not necessarily be similar devices.

Figure 3:
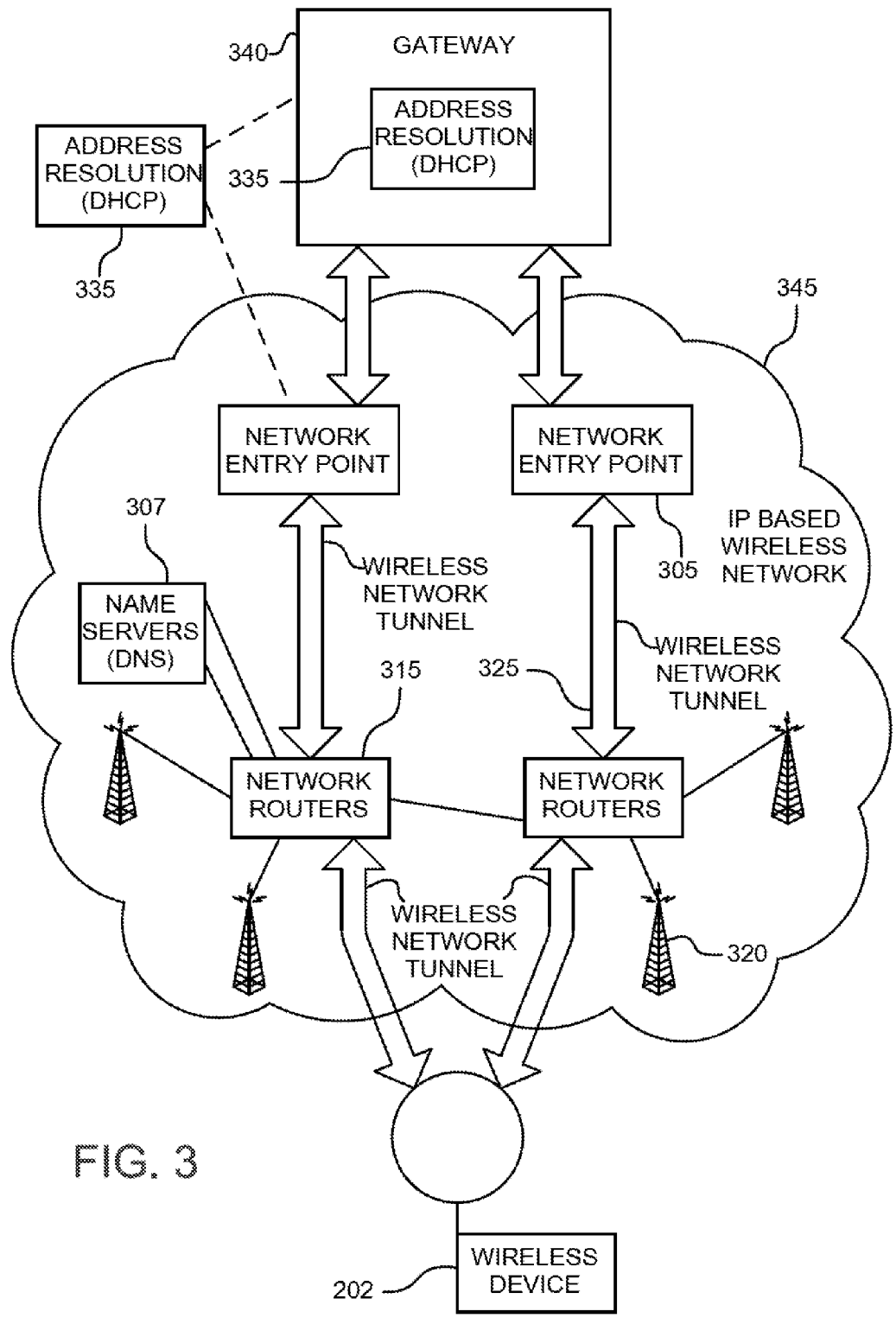
FIG. 3 shows a partial system architecture for the MCD and wireless network of FIGS. 1 and 2 for illustrating "pushed" data communications.

FIG. 3 shows a particular system structure for packet data communications with MCD 202. In particular, FIG. 3 shows basic components of an IP-based wireless data network which may be utilized for "pushed" data communications. MCD 202 communicates with a wireless packet data network 345, and may also be capable of communicating with a wireless voice network (not shown). As shown in FIG. 3, a gateway 340 may be coupled to an internal or external address resolution component 335 and one or more network entry points 305. Data packets are transmitted from gateway 340, which is source of information to be transmitted to MCD 202, through network 345 by setting up a wireless network tunnel 325 from gateway 340 to MCD 202. In order to create this wireless tunnel 325, a unique network address is associated with MCD 202. In an IP-based wireless network, however, network addresses are typically not permanently assigned to a particular MCD 202 but instead are dynamically allocated on an as-needed basis. It is thus preferable for MCD 202 to acquire a network address and for gateway 340 to determine this address so as to establish wireless tunnel 325.

Network entry point 305 is generally used to multiplex and demultiplex amongst many gateways, corporate servers, and bulk connections such as the Internet, for example. There are normally very few of these network entry points 305, since they are also intended to centralize externally available wireless network services. Network entry points 305 often use some form of an address resolution component 335 that assists in address assignment and lookup between gateways and MCDs. In this example, address resolution component 335 is shown as a dynamic host configuration protocol (DHCP) as one method for providing an address resolution mechanism.

A central internal component of wireless data network 345 is a network router 315. Normally, network routers 315 are proprietary to the particular network, but they could alternatively be constructed from standard commercially available hardware. The purpose of network routers 315 is to centralize thousands of fixed transceiver stations 320 normally implemented in a relatively large network into a central location for a long-haul connection back to network entry point 305. In some networks there may be multiple tiers of network routers 315 and cases where there are master and slave network routers 315, but in all such cases the functions are similar. Often network router 315 will access a name server 307, in this case shown as a dynamic name server (DNS) 307 as used in the Internet, to look up destinations for routing data messages. Fixed transceiver stations 320, as described above, provide wireless links to MCD 202.

Wireless network tunnels, such as a wireless tunnel 325, are opened across wireless network 345 in order to allocate necessary memory, routing, and address resources to deliver IP packets. Such tunnels 325 are activated as part of what are referred to as Packet Data Protocol or "PDP contexts" (i.e. packet data sessions). To open wireless tunnel 325, MCD 100 must use a specific technique associated with wireless network 345. The step of opening such a wireless tunnel 325 may require MCD 202 to indicate the domain, or network entry point 305 with which it wishes to open wireless tunnel 325. In this example, the tunnel first reaches network router 315 which uses name server 307 to determine which network entry point 305 matches the domain provided. Multiple wireless tunnels can be opened from one MCD 100 for redundancy, or to access different gateways and services on the network. Once the domain name is found, the tunnel is then extended to network entry point 305 and necessary resources are allocated at each of the nodes along the way. Network entry point 305 then uses the address resolution (or DHCP 335) component to allocate an IP address for MCD 100. When an IP address has been allocated to MCD 202 and communicated to gateway 340, information can then be forwarded from gateway 340 to MCD 202.

Figure 4:
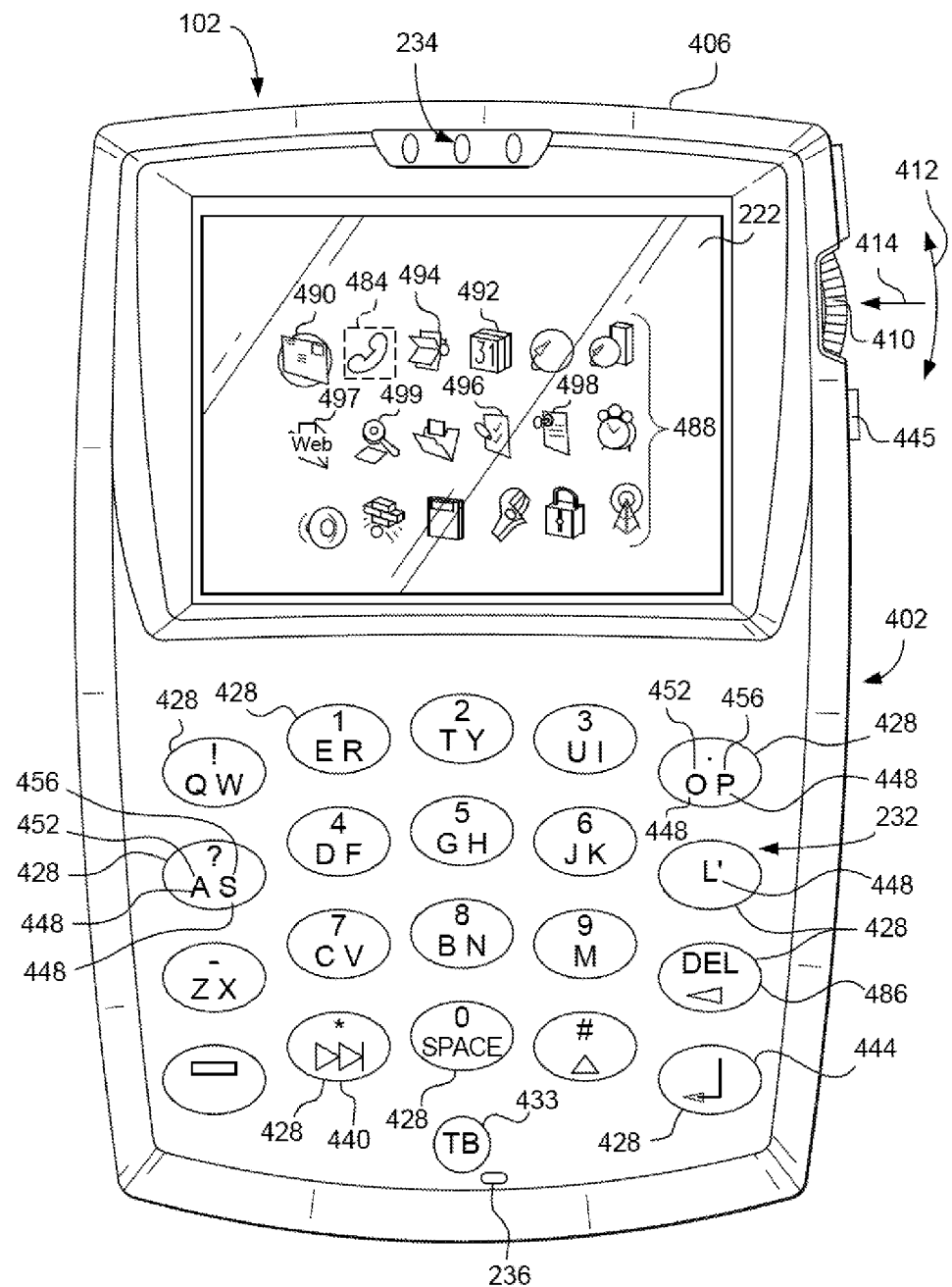
FIG. 4 is an illustrative example of an exemplary user interface of the MCD of FIGS. 1 and 2.

Referring now to FIG. 4, what is shown is an illustrative representation of an exemplary user interface 402 of MCD 202 which includes at, least display 222, keyboard 232, speaker 234, microphone 236, and a cursor or view positioning mechanism such as a positioning wheel 410 (e.g. a scroll-wheel) or a trackball 433. Although shown enlarged in FIG. 4 for clarity, this MCD 202 is sized to be a handheld portable device. As an alternative to or in addition to positioning wheel 410 and/or trackball 433, a wide range of one or more pointing or cursor/view positioning mechanisms such as a touch pad a joystick button, a mouse, a touchscreen, a tablet, or other whether presently known or unknown, may be employed. The cursor may be or include a pointer, a movable item or other visual cue used to mark a position or point to another item on a display, in order to, for example, indicate position for data entry or for selection of the other item.

Keys 428 of keyboard 232 are disposed on a front face of a housing 406 and positioning wheel 410 is disposed at a side of housing 406. Keyboard 232 is in the example form of a reduced QWERTY keyboard including a plurality of keys 428 that serve as input members. It can be seen that the arrangement of the characters 448 on keys 428 of keyboard 424 is generally of the QWERTY arrangement, albeit with many of keys 428 including two of characters 448. In the example depiction of keyboard 424, many of keys 428 include two characters, such as including a first character 452 and a second character 456 assigned thereto. Characters may include letters, digits, symbols and the like and can additionally include ideographic characters, components thereof, and the like. One of keys 428 of keyboard 424 includes as the characters 448 thereof the letters "Q" and "W", and an adjacent key 428 includes as the characters 448 thereof the letters "E" and "R". Keyboard 424 may be of other configurations, such as an AZERTY keyboard, a QWERTZ keyboard, a Dvorak keyboard, or other keyboard or keypad arrangement, and either reduced or not reduced (i.e. full). In a "full" or non-reduced keyboard or keypad arrangement, each key has a single letter (not multiple letters) of the alphabet assigned to it.

Among keys 428 of keyboard 232 are a <NEXT> key 440 and an <ENTER> key 444. The <NEXT> key 440, wherein, for example, "<NEXT>" may be a symbol or may be the word "next" provided (e.g. printed) on the key, may be pressed to provide a selection input to the processor and provides substantially the same selection input as is provided by a rotational input of positioning wheel 410. Since <NEXT> key 440 is provided adjacent a number of other keys 428 of keyboard 232, the user can provide a selection input to the processor substantially without moving the user's hands away from the keyboard 232 during a text entry operation. Another key, the <ESC> key 445 is disposed on the side of housing 406 adjacent positioning wheel 438, although the same or similar key may be disposed as part of keyboard 232. Among keys 428 of the keyboard 424 additionally is a <DEL> key 486 that can be provided to delete a text entry.

Positioning wheel 410 may serve as another input member and is both rotatable, as is indicated by an arrow 412, to provide selection inputs to the processor, and also can be pressed in a direction generally toward housing 406, as is indicated by an arrow 414 to provide another selection input to the processor. Display 222 may include a cursor 484 that depicts generally where the next input or selection from user interface 402 will be received. Display 222 is shown in FIG. 4 as displaying a home screen that represents a number of applications 586 (FIG. 3 shows some of the example possible applications 86) depicted as corresponding discrete icons 488. Icons 488 include, for example, an Electronic Mail (E-Mail) icon 490, a Calendar icon 492, an Address Book icon 494, a Tasks icon 496, a Messages icon 497, a MemoPad icon 498, and a Search icon 499, respectively.

Figure 5:
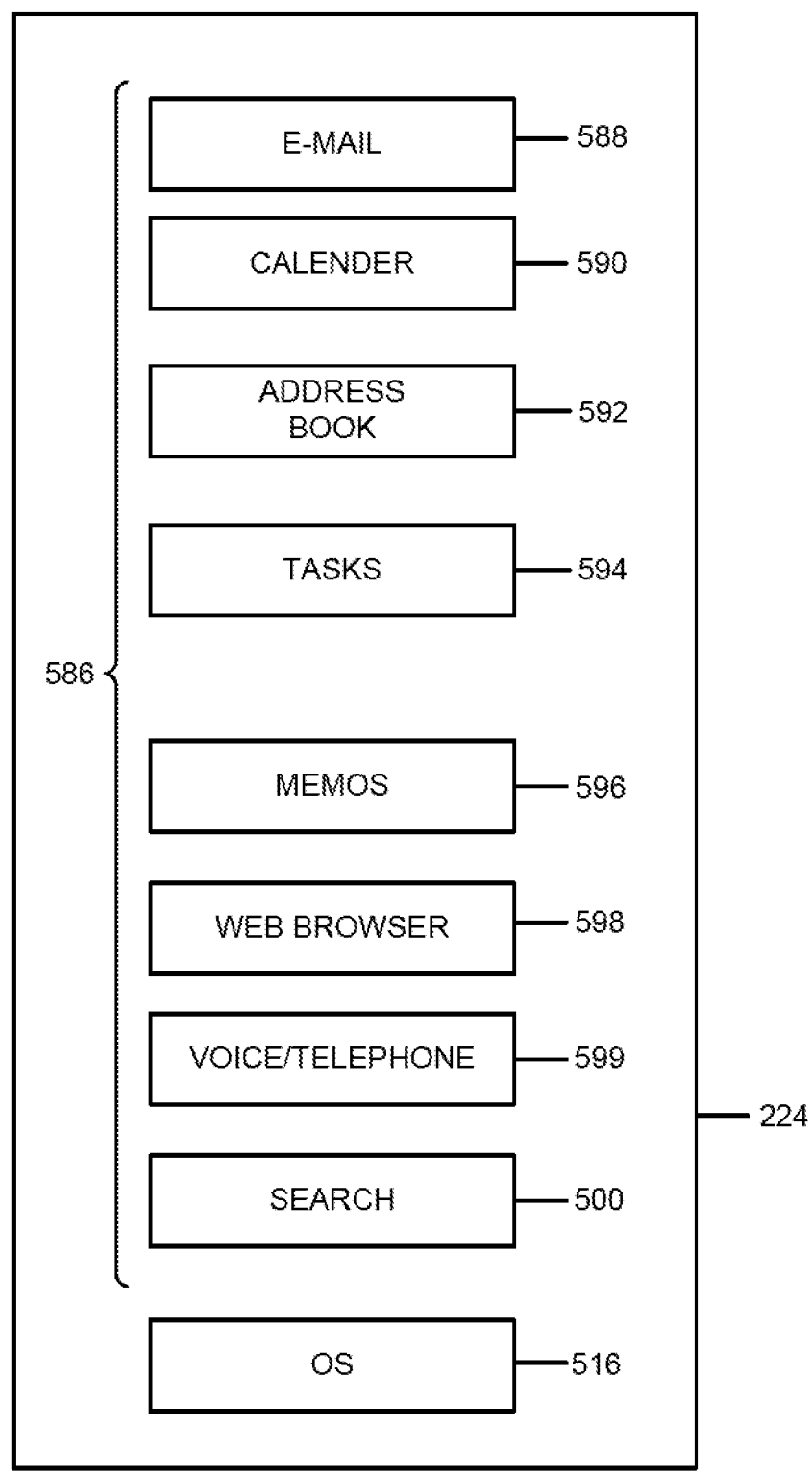
FIG. 5 is an illustrative representation of memory of the MCD which has a plurality of applications stored therein.

As shown further in FIG. 5, memory 224 of MCD 202 includes a plurality of applications or routines 586 associated with the visually displayed icons 488 of FIG. 4 for the processing of data. Applications 586 may be in any of a variety of forms such as, without limitation, software, firmware, and the like. Applications 586 include, for example, an Electronic Mail (E-Mail) application 588 (FIG. 5) associated with E-mail icon 490 (FIG. 4), a Calendar application 590 (FIG. 5) associated with Calendar icon 492 (FIG. 4), an Address Book application 592 (FIG. 5) associated with Address Book icon 494 (FIG. 4), a Tasks application 594 (FIG. 5) associated with Tasks icon 496 (FIG. 4), a MemoPad (Memos) application 596 (FIG. 5) associated with MemoPad icon 498, a Web Browser application 598 (FIG. 5) associated with Web Browser icon 497 (FIG. 4), a Voice/Telephone application 599 (FIG. 5) associated with Voice/Telephone icon 484, and a Search application 500 (FIG. 5) associated with Search icon 499 (FIG. 4). An operating system (OS) program 516 also resides in memory 224.

In FIG. 4, the "home" screen output is shown as currently active and constitutes the main "ribbon" application for displaying the icons 488 shown. An application, such as E-mail application 588 of FIG. 5, may then be initiated (opened or viewed) from user interface 402 by providing a suitable user input to it. For example, E-mail application 588 may be initiated (opened or viewed) by rotating positioning wheel 410 to highlight E-mail icon 490 and providing a selection input by translating positioning wheel 410 in the direction indicated by arrow 438. As another example, display 222 displays icon 499 associated with Search application 500 and accepts input from positioning wheel 410 to initiate a search from that icon 499. Applications 586 may be additionally or alternatively initiated (opened or viewed) from user interface 402 by providing another suitable input to it, such as by suitably rotating or "rolling" trackball 433 and providing a selection input by, for example, pushing the trackball 433 (e.g. somewhat similar to positioning wheel 410 except into the plane of FIG. 4).

Movement, navigation, and/or scrolling with use of a cursor/view positioning mechanism is beneficial given the relatively large size of visually displayed information and the compact size of display 222 of FIG. 4, and since information and messages are typically only partially presented in the limited view of display 222 at any given moment. As previously described, positioning wheel 410 is one helpful cursor/view positioning mechanism to achieve such movement. Positioning wheel 410, which may be referred to as a scrollwheel, specifically includes a circular disc which is rotatable about a fixed axis of housing 302 and may be rotated by the end user's index finger or thumb. When the information or message is being partially displayed, an upwards rotation of positioning wheel 410 causes an upwards scrolling such that display 222 presents viewing of an upper portion of the information or message. Similarly, a downwards rotation of positioning wheel 410 causes a downwards scrolling such that display 222 presents viewing of a lower portion of the information or message. Positioning wheel 410 is mounted along a fixed linear axis such that the end user can depress positioning wheel 410 inwards toward housing 406 (e.g. with the end user's index finger or thumb) for selection of information. Again, see the direction indicated by an arrow 414 of positioning wheel 410 shown.

Although a specific MCD 202 has just been described, any suitable MCD or terminal may be part of the methods and apparatus which will be described in better detail below. Note that many components of mobile device 202 shown and described may not be included (e.g. a full QWERTY keypad may be optional).

Figure 6A:
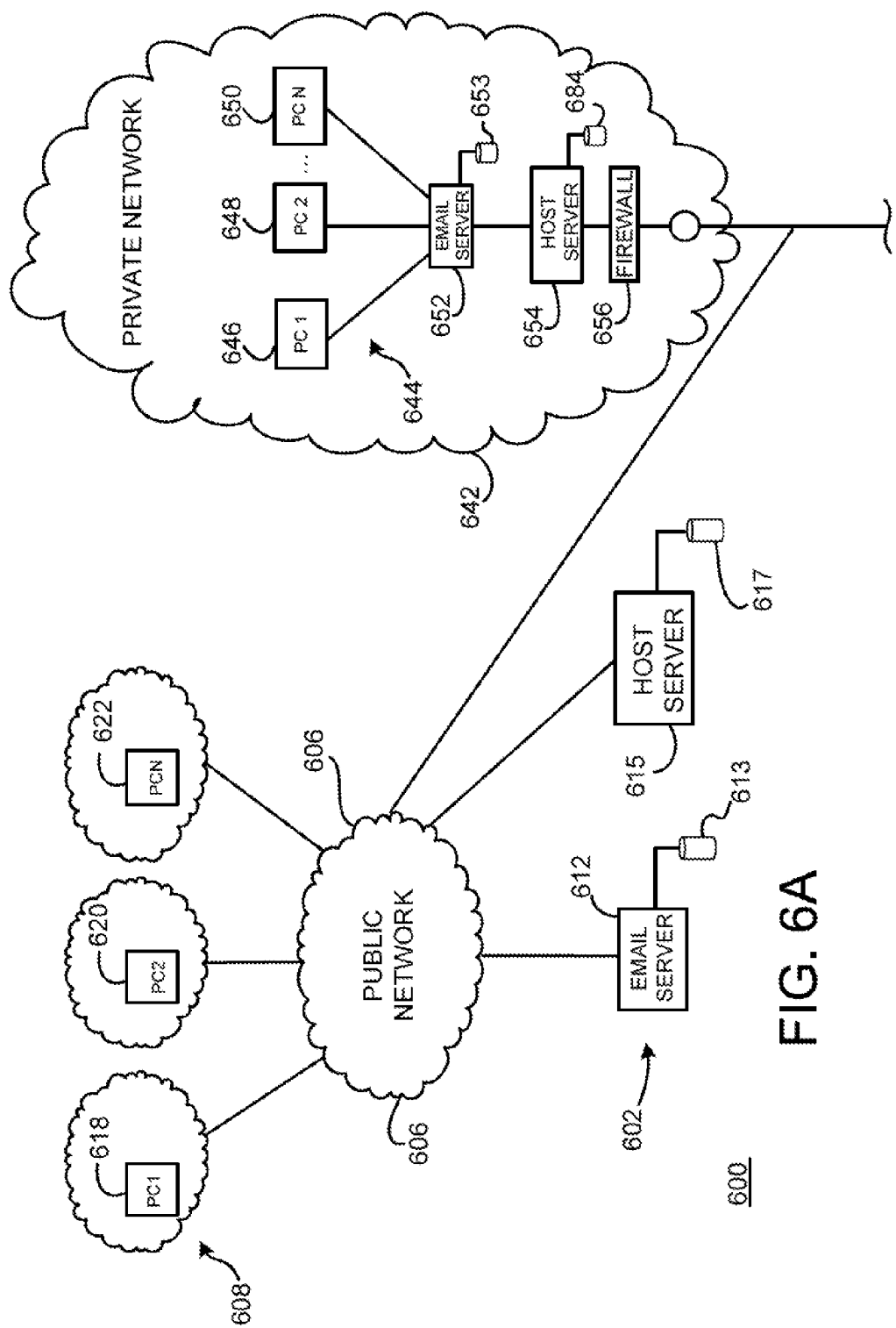
FIG. 6A-6B depict a larger communication system within which the mobile station in FIGS. 1-3 may operate for receiving e-mail messages which are pushed to it by the system.
Figure 6B:
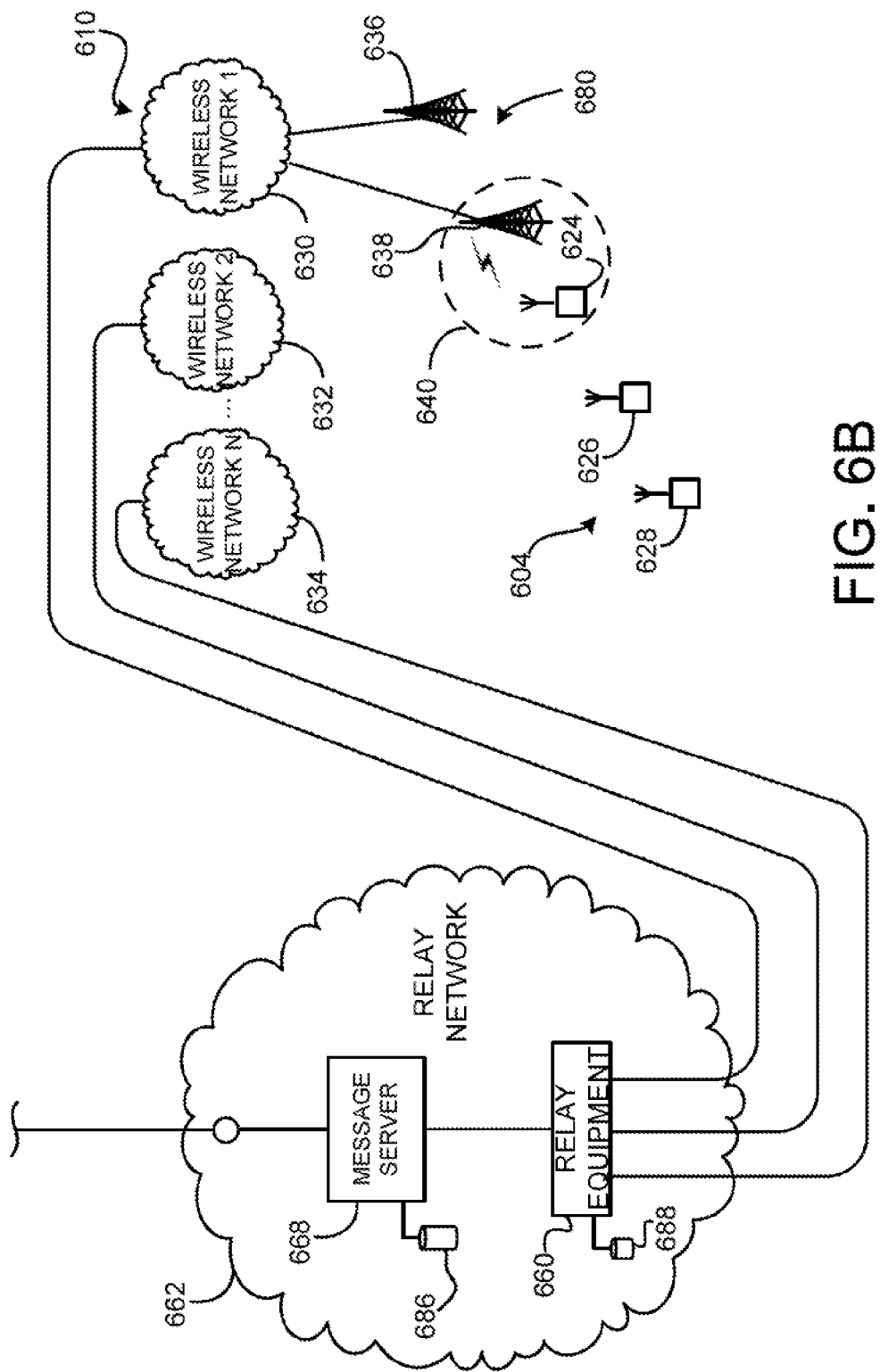

FIGS. 6A-6B depict a communication system 600 in which messages containing e-mail information may be pushed from a plurality of e-mail servers 602 (FIG. 6A) to a plurality of MCDs 604 (FIG. 6B). Communication system 600 may be the larger system within which a mobile communication device (MCD), such as the MCD described in relation to FIGS. 1, 2, and 3, may operate. Although messages containing e-mail information are described as being pushed to MCDs in the present embodiment, messages containing various other types of information, such as calendar information, Internet access, telephone communication information, or other various types of data, may be additionally or alternatively pushed to the devices.

The e-mail servers 602 that are shown in FIG. 6A include an e-mail server 612 which serves a plurality of terminals 608 of a public network 606 (e.g. the Internet) and an e-mail server 652 which serves a plurality of terminals 644 of a private network 642. Terminals 608 shown in public network 606 include terminals 618, 620, and 622, whereas terminals 644 shown in private network 642 include terminals 646, 648, and 650. In this embodiment, the terminals are computers such as desktop or laptop PCs which may be connected to e-mail server 612 via the Internet using any conventional means (e.g. telephone dial-up, cable, or DSL modem). End-users of the PCs are able to access their appropriate personal e-mail accounts for sending and receiving new e-mail, as well as reviewing, sorting, organizing, and otherwise managing previously received e-mail stored at the e-mail server.

An end-user of each terminal 608 connected in public network 606 has an e-mail account on e-mail server 612 which stores and manages e-mail messages in a local database 613 of memory for the respective terminal. Each terminal 608 and/or its corresponding e-mail account is associated with a respective one of MCDs 604 (FIG. 6B) to which e-mail information is pushed. Similarly, an end-user of each terminal 644 connected in private network 642 has an e-mail account on e-mail server 652 which stores and manages e-mail messages in a local database 653 of memory for the respective terminal. Each terminal 644 and/or its corresponding e-mail account is associated with a respective one of MCDs 604 to which e-mail information is pushed.

Terminals 644 connected in private network 642 and their respectively e-mail accounts are generally affiliated with each other; that is, they may be associated with the same group or business. For example, terminals 646, 648, and 650 may be utilized by the same company or business and use the same network domain name for e-mail purposes. In private network 642, e-mail server 652 and host server 654 privately serve each end user in the network. On the other hand, terminals 608 connected to public network 606 and their respective e-mail accounts are generally unaffiliated with each other; that is, they are not necessarily associated together with the same business or private network. For example, terminals 618 and 620 are not utilized by the same company nor are they part of the same private network. When an end user of one of terminals 608 accesses e-mail, for example, the end user's terminal is used to connect to e-mail server 612 via the Internet through an Internet Service Provider (ISP) using an appropriate Uniform Resource Locator (URL) (e.g. for a webmail-based service). Using the terminal, the end user sends his/her individual user name and password to log on to this e-mail server. If this user name and password information matches that stored at the e-mail server, the login is successful and an e-mail session is created so that the end-user can perform e-mail tasks.

Each MCD 604 (FIG. 6B) is portable and includes, for example, a hand-held housing with a display and a keyboard/keypad (e.g. miniature QWERTY-type keyboard), as well as a wireless transceiver, an antenna, and one or more processors which control the operation of the device. For example, see FIGS. 1 and 2. Each wireless communication network 610 is coupled to a plurality of base stations for providing wireless coverage for a MCD. For example, wireless communication network 630 is shown to have a plurality of base stations 680 including a base station 636 and a base station 638. Each base station (e.g. base station 638) helps establish a wireless coverage area or cell (e.g. a cell 640) within which a MCD (e.g. MCD 624) is able to communicate. Wireless communication networks 610 may include, as examples, cellular telecommunication networks and wireless local area networks (WLANs) (e.g. 802.11 based networks). At least some of wireless communication networks 610 are different from other wireless communication networks within communication system 600.

Each MCD 604 has the ability to send and receive e-mail information associated with its e-mail account managed by one of e-mail servers 612 and 652. The e-mail information is received by each MCD 604 via a (substantially) real-time automatic "push" methodology, in contrast to any method requiring devices 604 to invoke a manual connection for the receipt of e-mail information. The pushing of e-mail information from e-mail servers 612 and 652 to MCD 604 is facilitated with use of host servers 615 and 654, respectively, which are coupled to a relay network 662 (FIG. 6B). In private network 642, host server 654 communicates with relay network 662 through a firewall 656 which performs at least the conventional function of preventing unauthorized access into such network 642. A trigger mechanism is provided so that, when new e-mail messages are received or updated e-mail information is identified, host server 654 (or host server 615) receives a copy of such information from e-mail server 652 (or e-mail server 612) for delivery to a MCD. Host server 654 has a local database 684 in memory for storing (at least temporarily) such e-mail information received from e-mail server 652, and host server 615 has a local database 617 in memory for storing (at least temporarily) such e-mail information received from e-mail server 612.

Relay network 662 includes a message server 668 (or more generally, "server") and relay equipment 660. Message server 668 is part of a front end of relay network 662 that handles all incoming messages from all host servers into the relay network 662. Relay equipment 660, which is communicatively coupled to message server 662, is part of a back end of relay network 662 that is communicatively coupled to wireless communication networks 610 for relaying all messages to MCDs 604. In general, when a new e-mail message is received at an e-mail server (e.g. e-mail server 652), its corresponding host server (e.g. host server 654) is configured to receive a copy of e-mail information of the e-mail message for delivery in a message to the associated MCD. Host server 654 causes this message to be delivered to relay network 662, which relays the message to the MCD through the appropriate wireless communication network. Note that relay network 662 may serve a very large number of such host servers and networks (which include host servers 615 and 654 in networks 606 and 642, respectively) for communicating messages generally in this fashion.

Referring now to FIG. 7, a flowchart of a method for increasing voice call performance through controlled temporary interruption of data transfer in a relay network is shown. The techniques may be embodied in the MCD, the relay network, and/or components thereof. The MCD and the relay network, which is outside of the wireless network The techniques may further be embodied as computer instructions stored in a computer readable medium (e.g. memory, computer disk, etc) which are executable on one or more processors (e.g. microprocessor, controller, or microcontroller, etc.) for executing the logic according to the flowchart.

Beginning at a start block 702 of FIG. 7, the MCD receives a voice call request for establishing a voice call with a call participant via the wireless network with (step 704 of FIG. 7). The voice call request may be received as a request from a user through a user interface of the MCD, or as a request from the call participant via the wireless network. In response, the MCD sends a call confirm or setup voice call message to the wireless communication network for establishing the voice call. In addition, the MCD also sends, via the wireless network, a pause data indicator to the relay network. The pause data indicator is defined to pause data transfer for the MCD at the relay network. The pause data indicator is sent to the relay network in a message which is addressed to a server in the relay network. In response to receiving the pause data indicator, the relay network updates a MCD status in a relay database to a pause data state. In the pause data state, instead of sending any mobile-terminated data for the MCD that it may receive from a host server, the relay network pauses transmission of and buffers the mobile-terminated data for future transmission (step 706 of FIG. 7). In one embodiment, the relay network is configured to pause and buffer all mobile-terminated data received from the host server during the voice call. In another embodiment, the relay network allows for sending of service-essential data (such as a remote data wipe command, an IT policy update, etc.) to the MCD while pausing transmission of all other (non-essential) data.

Sometime during the voice call, the MCD receives a voice call termination request for terminating (i.e. ending) the voice call (step 708 of FIG. 7). The voice call termination request may be received as a request from the user through the user interface of the MCD, or as a request from the call participant via the wireless network. In response, the MCD sends a disconnect voice call message to the wireless communication network for terminating the voice call. If the request is initiated by the other call participant, the MCD receives a disconnect voice call message from the wireless communication network for terminating the voice call.

In addition, the MCD sends a resume data indicator to the relay network via the wireless network. The resume data indicator is defined to resume data transfer at the relay network for the MCD. The resume data indicator is sent to the relay network in a message which is addressed to the server in the relay network. In response to receiving the resume data indicator, the relay network updates the MCD status in the relay database to a resume data state. In the resume data state, the relay network resumes the transmission of the buffered data for the MCD, and allows sending any further mobile-terminated data for the MCD that it may receive from the host server (step 710 of FIG. 7).

Figure 8A:
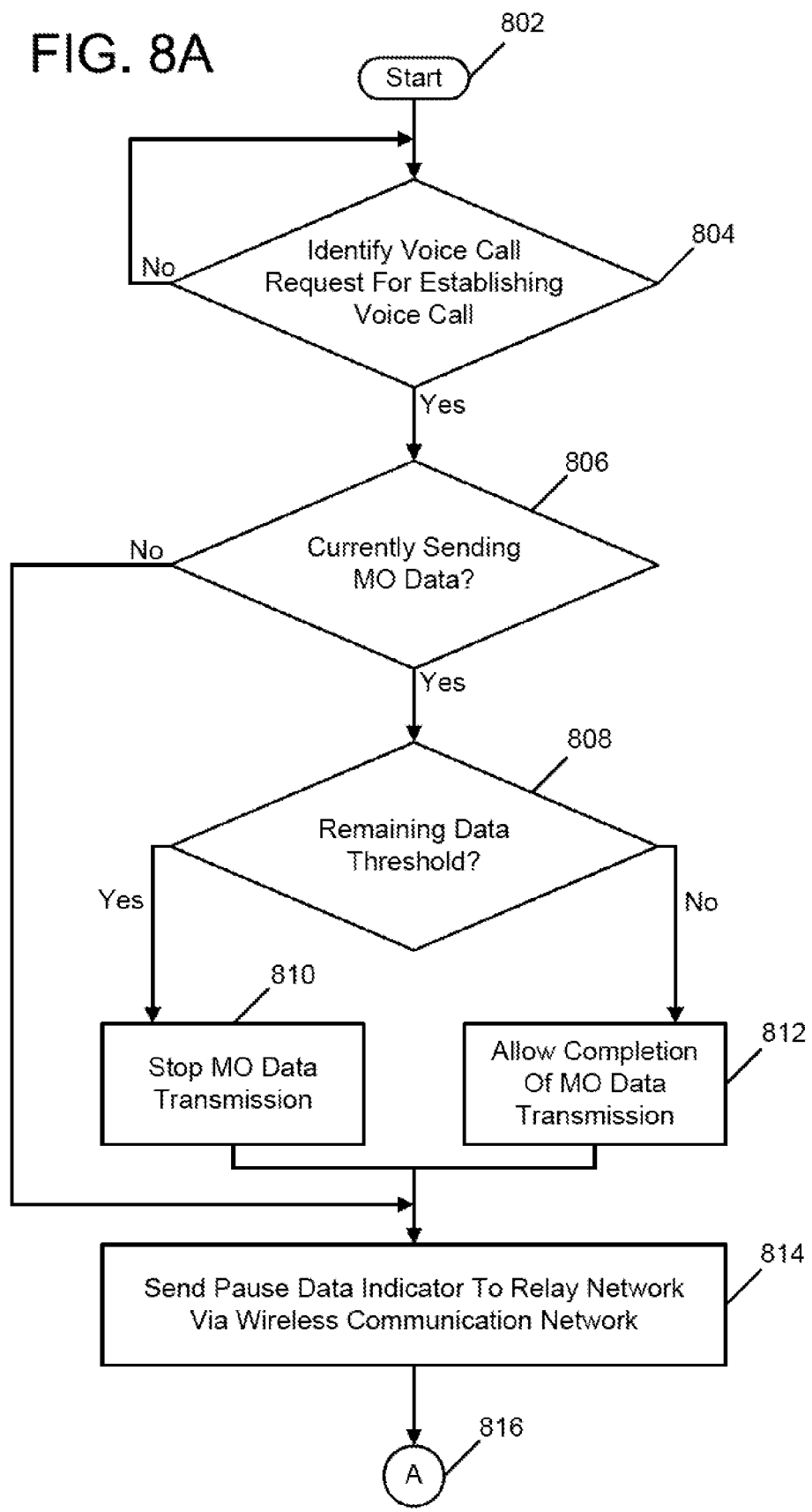

FIGS. 8A-8B show a more detailed flowchart for the method of increasing voice call performance, from the perspective of the MCD. Beginning at a start block 802 of FIG. 8A, the MCD monitors to identify a voice call request for establishing a voice call with a call participant (step 804 of FIG. 8A). The voice call request may originate at the MCD or, in the alternative, may originate from the call participant and be received at the MCD as a message via the wireless network. If there is no voice call request identified at the present time at step 804, the MCD continues monitoring for the voice call request.

If there is a voice call request identified at step 804, the MCD identifies whether it is currently sending any mobile-originated (MO) data (step 806 of FIG. 8A). If the MCD is sending MO data at the time the voice call request is identified (step 802 of FIG. 8A), the MCD identifies whether a remainder of the MO data is larger than a predetermined threshold (step 808 of FIG. 8A). If the remainder is larger than the predetermined threshold as identified at step 808, the MCD operates to cease or stop the transmission of the MO data (step 810 of FIG. 810). If the remainder is less than or equal to the predetermined threshold at step 808, the MCD operates to complete the transmission of the MO data (step 812 of FIG. 8A).

The MCD sends a pause data indicator to the relay network via the wireless network (step 814 of FIG. 8A) after transmission of the MO data is stopped in step 810, or after/during MO data transmission in step 812, or after step 806. The pause data indicator is defined to pause data transfer at the relay network. That is, instead of sending any mobile-terminated data for the MCD that it may receive from a host server, the relay network pauses transmission of and buffers the mobile-terminated data for future transmission.

Continuing the flowchart to FIG. 8B through connector "A" 818, where the voice call request originates at the MCD, the MCD sends a setup voice call message to the wireless network for establishing the voice call (step 820 of FIG. 8B). Where the voice call request is received via the wireless network at the MCD, the MCD sends a call confirm message to the wireless network for establishing the voice call in step 820. Once the voice call has been established, the MCD performs operations to maintain the voice call (step 822 of FIG. 8B).

At some point during the voice call, the MCD identifies a voice call termination request for terminating (i.e. ending) the voice call (step 824 of FIG. 8B). The voice call termination request may be received as a request from the user through the user interface of the MCD, or as a request from the call participant via the wireless network. In response, in the case of a MO termination, the MCD sends a disconnect voice call message to the wireless network in (step 826 of FIG. 8B). Alternatively, in the case of a MT termination, the MCD receives a voice call termination request as a disconnect message from the wireless communication network. The MCD also sends a resume data indicator to the relay network via the wireless network (step 828 of FIG. 8B). The resume data indicator is defined to resume data transfer for the MCD at the relay network. From there, the relay network operates to send to the MCD any buffered data and any subsequent mobile-terminated data for the MCD received from the host server. In turn, the MCD receives any data that was buffered by the relay network during the voice call (step 830 of FIG. 8B) and subsequent mobile-terminated data. The flowchart ends at an end block 832 of FIG. 8B.

Note that data transfer for the MCD ordinarily occurs in a data session (e.g. a Packet Data Protocol or "PDP" Context), and the pausing of the data transfer occurs while maintaining the data session (e.g. without tearing down the PDP Context). The pause data indicator is sent to the relay network automatically without requiring the user of the MCD to manually configure the MCD settings. This is particularly advantageous because users of the MCD may forget to manually change settings to reflect their desired settings. Further, the wireless network has no knowledge of the contents of the data exchanged between the MCD and the relay network. The signaling is accomplished using existing communication protocols through which the MCD and the relay network communicate.

FIG. 9 shows a more detailed flowchart for the method of increasing voice call performance from the perspective of the relay network. Beginning at a start block 902 of FIG. 9, the relay network monitors for receipt of a pause data indicator from the MCD. If the relay network receives the pause data indicator from the MCD (step 904 of FIG. 9), the relay network updates a MCD status for the MCD in a relay database to a pause data state (step 906 of FIG. 9). When the MCD status is set to the pause data state, the relay network pauses sending of all mobile-terminated (MT) data to the MCD (step 908 of FIG. 9). The relay network buffers any and all received MT data (step 910 of FIG. 9) for subsequent transmission to the MCD. In one embodiment, in the pause data state, the relay network permits the transmission of service-essential data (such as a remote data wipe command, or an IT policy update) while buffering all other (non-essential) MT data for subsequent transmittal to the MCD.

The relay network monitors for receipt of a resume data indicator from the MCD via the wireless network. In response to the receipt of the resume data indicator by the relay network (step 912 of FIG. 9), the relay network updates the MCD status in its database to a resume data state (step 914 of FIG. 9). The relay network then resumes the transmission of the buffered data to the MCD, and will communicate all subsequent MT data for the MCD received from the host server (step 916 of FIG. 9). The flowchart ends at step 918 of FIG. 9.

In one embodiment, an initiation by the MCD or the user thereof for the communication of mobile-originated (MO) data during a voice call in the pause data state is permitted, and mobile-terminated (MT) data resulting therefrom is also permitted. In another embodiment, such initiation of MO data further causes the relay network to set the MCD status to the resume data status, or otherwise causes the relay network to communicate both MO and MT data without buffering.

In another embodiment, communication of MO data from the MCD to the relay network may be paused based on user preferences set at the MCD. The user of the MCD may set a preference at the MCD to allow user-initiated MO data transmission. Such transmission would be preceded by the transmission of the resume data signal with the effect of disabling the network pausing for the duration of the call.

Thus, methods and apparatus for use by a mobile communication device (MCD) operating in a wireless communication network for increasing call performance through controlled temporary interruption of data transfer by the relay network outside of the wireless network have been described. One illustrative method involves identifying a voice call request at the MCD operating in a wireless network and, in response to identifying the voice call request, performing the following actions of sending a pause data indicator to the relay network over the wireless communication network; sending a call confirm or setup voice call message to the wireless communication network for establishing the voice call; and maintaining the voice call at the mobile communication device. The pause data indicator is defined to pause data transfer at the relay network. The method may further involve identifying a voice call termination request during the voice call and, in response to identifying the voice termination request, performing the following actions of sending a disconnect voice call message to the wireless communication network; and sending a resume data indicator to the relay network over the wireless communication network.

Advantageously, the present techniques reduce the likelihood of dropping voice calls for MCDs. Communication of mobile-terminated data (such as email data) is suspended during a voice call, but then subsequently resumed to the MCD after completion of the voice call. Such techniques are performed in the relay network which is outside of the wireless network, without requiring awareness or special processing or modifications in the wireless network, and without increasing the signaling load in the wireless network. Also specifically, the present techniques do not require data sessions (e.g. PDP contexts) of the MCD to be torn down and re-established, and the dynamically-assigned IP address to be changed, every time the MCD operates in a voice call. The relay network has the responsibility of buffering mobile-terminated data once the voice call is established and the pause data indicator is received, as well as resuming the mobile-terminated data transmission once the voice call is terminated and the resume data indicator is received. Note further that the present techniques may be implemented with use of existing signaling protocols established between the relay network and the MCD. The present techniques may also maintain a level of security in the wireless network by allowing essential or emergency mobile-terminated traffic, such as remote wipe commands or IT policy updates to be delivered to the MCD, even if other mobile-terminated data to the MCD is paused.

The above-described embodiments of the present disclosure are intended to be examples only. Those of skill in the art may affect alterations, modifications, and variations to the particular embodiments without departing from the scope of the application. The invention described herein in the recited claims intends to cover and embrace all suitable changes in technology.

The invention claimed is:

1. A method in a mobile communication device operating in a wireless communication network for receiving data, the method comprising:
   receiving, via the wireless communication network, data communications from a host server of a host network, the data communications routed via a relay network which is external to the wireless communication network and the host network, the data communications from the host server associated with a data session established between the mobile communication device and the wireless communication network;
   identifying a voice call request at the mobile communication device;
   in response to the voice call request:
      sending via the wireless communication network a pause data indicator in a message which is directed to the relay network, the pause data indicator defined to cause the data communications to be paused and the data of the data communications to be buffered at the relay network while the data session is maintained;
      sending a call confirm or setup voice call message to the wireless communication network for establishing the voice call; and
      maintaining the voice call at the mobile communication device;
   identifying that mobile-originated data is sent from the mobile communication device at the time the voice call request is identified; and
   completing transmission of the mobile-originated data when a remainder of the mobile-originated data is less than a predetermined threshold at the time the voice call request is identified.

2. The method of claim 1, further comprising:
   identifying a voice call termination request;
   in response to the voice call termination request:
      sending or receiving a disconnect voice call message to or from the wireless communication network for terminating the voice call; and
      sending via the wireless communication network a resume data indicator in a message which is directed to the relay network, the resume data indicator defined to cause the data communications from the host server to be resumed at the relay network for communicating the buffered data to the mobile communication device.

3. The method of claim 1, wherein the mobile communication device comprises a cellular telephone.

4. The method of claim 1, further comprising:
   ceasing transmission of the mobile-originated data when the remainder of the mobile-originated data is greater than the predetermined threshold at the time the voice call request is identified.

5. The method of claim 1, wherein the user of the mobile communication device may manually configure the mobile communication device to send the pause data indicator upon establishing the voice call.

6. A mobile communication device operating in a wireless communication network, comprising:
   one or more processors;
   a wireless transceiver coupled to the one or more processors and being operative for communications in a wireless communication network;
   a user interface coupled to the one or more processors;
   the one or more processors being operative to:
      receive, via the wireless transceiver, data in a data communications from a host server of a host network, the data communications via a relay network which is external to the wireless communication network and the host network, the data transfer communications the host server associated with a data session established between the mobile communication device and the wireless communication network;
      identify via the user interface a voice call request;
      in response to the voice call request:
         send via the wireless communication network a pause data indicator in a message directed to the relay network, the pause data indicator defined to cause the data transfer communications to be paused and the data of the data communications to be buffered at the relay network while the data session is maintained;
         send via the wireless transceiver a call confirm or setup voice call message to the wireless communication network for establishing the voice call; and
         maintain the voice call at the mobile communication device;
      identify mobile-originated data sent during the identifying of the voice call request at the mobile communication device; and
      complete transmission of the mobile-originated data when a remainder of the mobile-originated data is less than a predetermined threshold at the time of the voice call request.

7. The mobile communication device of claim 6, the one or more processors being further operative to:
   identify a voice call termination request;
   in response to the voice call termination request:
      send or receive a disconnect voice call message to or from the wireless communication network; and
      send via the wireless communication network a resume data indicator in a message directed to the relay network, the resume data indicator defined to cause the data transfer communications to be resumed at the relay network for communicating the buffered data to the mobile communication device.

8. The mobile communication device of claim 6, which comprises a cellular telephone.

9. The mobile communication device of claim 6, the one or more processors being further operative to:
cease transmission of the mobile-originated data when the remainder of the mobile-originated data is less than the predetermined threshold at the time of the voice call request.

10. The mobile communication device of claim 6, which can be configured manually to send the pause data upon establishing the voice call request is identified.

11. A method in a relay network for use in communicating data from a host server of a host network to a mobile communication device, the method comprising:
forwarding, by the relay network, data of data communications from the host server of the host network to the mobile communication device which operates in a wireless communication network, the relay network being external to the wireless communication network and the host network and serving a plurality of host servers for data communications;
receiving, at the relay network, a pause data indicator from the mobile communication device responsive to a voice call request for a voice call;
in response to receiving the pause data indicator:
updating, in a database of the relay network, the mobile communication device status to a pause data state;
pausing, at the relay network, the data transfer communications to the mobile communication device during the voice call of the mobile communication device; and
buffering the data of the data communications in the relay network during the voice call for subsequent transmission to the mobile communication device; and
permitting transmission of service-essential data to the mobile communication device during the pause data state, wherein the service-essential data comprises at least one of a remote data wipe command to the mobile communication device and an IT policy update to the mobile communication device.

12. The method of claim 11, further comprising:
receiving a resume data indicator from the mobile communication device responsive to a voice call termination request for the voice call of the mobile communication device;
in response to receiving the resume data indicator:
updating the mobile communication device status in the database to a resume data state; and
scheduling a transmission of the buffered data of the data communications to the mobile communication device.

13. The method of claim 11, further comprising:
scheduling a transmission of outstanding messages to the mobile communication device in the order of descending importance.

14. A server of a relay network, the server configured to:
allow data in data communications from a host server of a host network to be forwarded to a mobile communication device which operates in a wireless communication network, the relay network being external to the wireless communication network and the host network and serving a plurality of host servers for data communications;
receive a pause data indicator from the mobile communication device responsive to a voice call request for a voice call, the pause data indicator included in a message which is directed to the server;
in response to receiving the pause data indicator:
update, in a database of the relay network, a mobile communication device status to a pause data state;
pause the data communications to the mobile communication device during the voice call of the mobile communication device; and
buffer the data of the data communications during the voice call for subsequent transmission to the mobile communication device; and
permit transmission of service-essential data to the mobile communication device during the pause data state, wherein the service-essential data comprises at least one of a remote data wipe command to the mobile communication device and an IT policy update to the mobile communication device.

15. The server of claim 14, which is further configured to:
receive a resume data indicator from the mobile communication device in a message which is directed to the server;
in response to receiving the resume data indicator:
update, in the database, the mobile communication device status to a resume data state; and
resume transmission of the buffered data to the mobile communication device.

* * * * *